United States Patent
Sanders et al.

[15] 3,653,183
[45] Apr. 4, 1972

[54] METHYL ETHERS OF POLYALKOXYLATED POLYOLS FOR REMOVING ACIDIC GASES FROM GASES

[72] Inventors: Herbert L. Sanders, Skokie, Ill.; Robert A. Swenson; John B. Braunwarth, both of Janesville, Wis.

[73] Assignee: Northern Petrochemical Company, Des Plaines, Ill.

[22] Filed: Feb. 12, 1970

[21] Appl. No.: 11,003

[52] U.S. Cl. ................................................. 55/56, 55/73
[51] Int. Cl. ............................... B01d 19/00, B01d 53/00
[58] Field of Search ...................... 55/44, 53, 55, 56, 68, 73; 260/615 B

[56] References Cited

UNITED STATES PATENTS

| | | | |
|---|---|---|---|
| 2,552,528 | 5/1951 | De Groote | 260/615 B |
| 2,649,166 | 8/1953 | Porter et al. | 55/68 X |
| 2,733,272 | 1/1956 | Horsley et al. | 260/615 B |
| 2,781,863 | 2/1957 | Bloch et al. | 55/73 X |
| 2,951,094 | 8/1960 | Hefner | 260/615 B |
| 3,362,133 | 1/1968 | Kutsher et al. | 55/73 X |

*Primary Examiner*—Reuben Friedman
*Assistant Examiner*—R. W. Burks
*Attorney*—Merriam, Marshall, Shapiro & Klose

[57] ABSTRACT

Polymethyl ethers of a polyether polyol, the polyether polyol having the formula

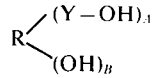

where R is the residue of an organic compound having 3 to 6 hydroxyls, A is 1 to 6, B is 0 to 5 and A + B equals 3 to 6 and Y is 1 to 15

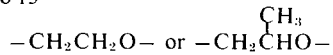

groups or mixtures thereof. Ethoxylated glycerol trimethyl ether is disclosed. The compounds are useful for extracting acid gases such as $CO_2$ and $H_2S$ from natural gas.

8 Claims, No Drawings

METHYL ETHERS OF POLYALKOXYLATED POLYOLS FOR REMOVING ACIDIC GASES FROM GASES

This invention is concerned with novel derivatives of polyether polyols which remove acid gases from admixture with non-acidic gases. The invention is also concerned with an improved process for the removal of carbon dioxide and/or hydrogen sulfide from a gaseous mixture of hydrocarbons and/or other non-acidic constituents containing said acid gases, using as a selective solvent a mixture of methyl ethers of a polyalkoxylated polyol.

The acid gas content of natural gas varies between broad limits, depending on the field from which it is produced. Natural gas from some sources contains undesirably high concentrations of acid gases such as hydrogen sulfide and carbon dioxide. Before this gas can be sold, the acid gas content must be reduced to an acceptable concentration. Various methods to remove acid gases from natural gas have been proposed. One approach which is used is to contact the natural gas with a chemical which reacts with and removes acid gases in chemically combined form. For example, hot potassium carbonate, monoethanolamine, and diglycolamine have been used for removing carbon dioxide from natural gas. Because of the expense of regenerating a chemically reactive purification solvent by heating, the cost of treating natural gases which have high acid gas contents with a reactive solvent becomes very high.

A second approach to acid gas removal is the use of a physical solvent which has selective solvency for acid gases rather than the hydrocarbon gas content. Examples of such physical solvents which have been used commercially are propylene carbonate and polyethylene glycol dimethyl ether. The solubilities of acid gases in the solvent is a function of the partial pressure of the acid gases, and of the total pressure of the system. No elaborate solvent regeneration process is needed since the acid gases are simply released when pressure is reduced. While there are useful solvents for this purpose, additional solvents are needed so that the choice of solvent for a particular use is not restricted by commercial availability and economics.

According to the present invention, there are provided novel methyl ethers of polyether polyols useful as solvents for removing acid gases such as carbon dioxide and hydrogen sulfide from natural gas and other gaseous lower alkane hydrocarbons as well as from hydrogen and nitrogen.

The methyl ethers of polyether polyols provided herewith contain from about three to six methoxy groups and are derivatives of polyether polyols having at least three and up to six hydroxyl groups.

The polyether polyols used in producing the polymethyl ether derivatives can be represented as follows:

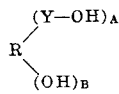

where R is the residue of an organic compound containing therein three to six active hydrogen atoms present in hydroxyl groups, A is a number from 1 to 6, B is a number from 0 to 5 and A + B equals 3 to 6, and y represents from 1 to 15

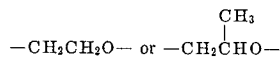

groups or such groups in admixture in random or block arrangement. The polyether polyols are thus polyoxyalkylene derivatives of polyols having three to six hydroxyls and the polyoxyalkylene groups are polyoxyethylene, polyoxypropylene or mixtures of polyoxyethylene polyoxypropylene groups. Typical of the organic residues which Y can represent are those from polyols such as glycerol, trimethylolpropane, pentaerythritol, dipentaerythritol, sorbitol and 1,2,6-hexanetriol.

More specifically, some of the polyether polyols useful in this invention are:
polyoxyethylene adducts of glycerol,
polyoxypropylene adducts of glycerol,
polyoxyethylene adducts of trimethylolpropane,
polyoxypropylene adducts of trimethylolpropane,
polyoxyethylene adducts of pentaerythritol,
polyoxypropylene adducts of sorbitol,
polyoxypropylene-polyoxyethylene adducts of glycerol and
polyoxypropylene-polyoxyethylene adducts of trimethylolpropane Those compounds containing both polyoxypropylene and polyoxyethylene groups can have such groups present as blocks or randomly located. Furthermore, all of the polyoxyalkylene groups can be positioned on all, one, or any number less than all, of the hydroxyl groups of the polyol base. Usually, however, the polyether polyol is prepared by alkoxylating all the hydroxyl groups of the polyol.

The polyether polyols are readily prepared by procedures disclosed in the art. Thus, to alkoxylate all the hydroxyl groups on a polyol, an alkylene oxide or mixture of alkylene oxides can be reacted with the polyol at an elevated temperature and pressure in the presence of an alkaline catalyst such as sodium alkoxide or sodium hydroxide. An amount of alkylene oxide is used with a given polyol to produce a polyether polyol of suitable average molecular weight. The addition of ethylene oxide or propylene oxide to a polyol produces a complex mixture of adducts which vary both in the number of oxide units attached to each molecule and in the position at which the oxide units are attached to the molecule. Since the polyether polyol is a mixture of compounds of different molecular weights, it is assumed that the average molecular weight of these compounds is the molecular weight of the product. It can be calculated from the amount of alkylene oxide added and/or the hydroxyl number of the adduct.

There are many U.S. Pat. Nos. disclosing the preparation of polyether polyols which, in a suitable molecular weight, can be used in the subject invention, amongst which are: 2,552,528; 2,597,204; 2,626,911; 2,673,882; 2,674,619; 2,733,272; 2,866,774; 2,927,918; and 2,948,757. Although some of the polyether polyols disclosed in these patents have higher molecular weights than would those used in this invention, it is simple to make the lower molecular weight compounds by using less alkylene oxide in the reaction to react with the polyol.

To produce polyether polyols in which one or any number less than all the hydroxyl groups are alkoxylated with an alkylene oxide, it is advisable to first convert those hydroxyl groups which it is not desired to alkoxylate to methyl ethers. The methyl ether groups are nonreactive to alkylene oxide which thus reacts only with the remaining free hydroxyl groups. Such reactions are well known in the art.

Conversion of a polyether polyol to the polymethyl ether is readily effected by reacting it with sodium hydroxide and methyl chloride, although it is possible to use metallic sodium in place of the sodium hydroxide, and/or other methyl halides or dimethyl sulfate in place of methyl chloride. In any event, the methyl ether formation is accompanied by the formation of a byproduct salt which is separated from the product. The salt can be separated by conventional means such as filtration, decantation, extraction, and/or distillation. In some cases, it is advantageous to conduct the methylation in two or more steps with salt separation after each step.

The polymethyl ether derivatives of the polyether polyols provided broadly according to this invention can be represented by the formula

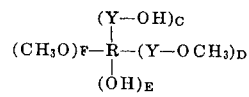

wherein C is a number from 0 to 3, D is a number from 1 to 6, E is a number from 0 to 3, F is a number from 0 to 5 and C+D+E+F equals 3 to 6 and Y represents from 1 to 15

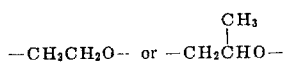

groups or such groups in admixture in random or block arrangement and R has the significance previously assigned.

In general, the properties of the compounds of this invention such as low viscosity, low vapor pressure and high solvency for acid gases are optimized by a high degree of methylation, although for some purposes it is not necessary to completely methylate the polyether polyol. Products which are generally most suitable for use as acid gas solvents are those having at least 70 percent and advisably 90 percent or more of the hydroxyl groups of the polyether polyol converted to methyl ether groups. Products which have an average molecular weight between about 150 to 800, and advisably about 200 and 600, generally have the most desirable properties for use as solvents for removing acid gases from natural gas and other gaseous hydrocarbons. Particularly useful solvents provided herewith are those of the formula

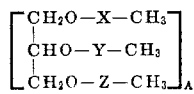

wherein X, Y and Z represent from 0 to 15

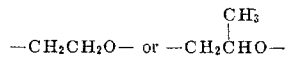

groups or such groups in admixture and the sum of X + Y + Z is 1 to 15, and A is 1 to 4. Furthermore, those where A is 1 and X, Y and Z are approximately the same number are generally especially useful.

The treatment of natural gas, gaseous lower alkane hydrocarbons, hydrogen and nitrogen containing one or more acid gases with the solvents of this invention is carried out using conventional absorption procedures, wherein the gaseous mixture is contacted with the solvent under pressure in a countercurrent absorption tower in a continuous flow method. The acid gas-enriched solvent is continuously withdrawn from the absorption tower and is introduced into a flash chamber to remove the absorbed acid gases by reduction of pressure. A vacuum flash or air stripping column may also be used as a final step to further reduce the acid gas content of the solvent. The regenerated solvent is then re-cycled through the absorption tower where it is used again.

The extraction process is best carried out at temperatures within the range from about 20° to 120° F. although higher or lower temperatures may be utilized. The minimum temperature at which a solvent may be used is governed by the increased viscosity of the solvent at low temperatures; the maximum temperature at which a solvent may be used is governed by the lower acid gas solubility at higher temperatures, as well as the increased vapor pressure of the solvent at high temperatures.

The following examples will serve to illustrate the preparation of some of the novel compounds of this invention, and to demonstrate the experimentally determined utility of the compounds as solvents for acid gases.

EXAMPLE 1

Preparation of Ethoxylated Glycerol Trimethyl Ether

To a 2-liter stainless steel stirred pressure reactor was charged 492 g. of glycerol and 1.0 g. of 50 percent sodium hydroxide. The charge was heated to 280° F. at which temperature a total of 608 g. of ethylene oxide was added over a period of 3 hours. The resulting product was a clear colorless liquid which was found to have a hydroxyl equivalent weight of 68.7, corresponding to an average molecular weight of 206.

The ethoxylated glycerol, 850 g., was returned to the reactor along with 250 g. of flaked sodium hydroxide and the charge was heated to 250° F. and stirred under a vacuum of 30 mm. Hg for 2 hours during which time 68 g. of water was removed. Methyl chloride was added beginning at 250° F. and was continued for 3 hours at 250°–280° F. and 50 p.s.i.g. During this reaction, 315 g. of methyl chloride was absorbed. The product was removed from the reactor and filtered. The sodium chloride byproduct was washed several times with isopropanol, the isopropanol washings were combined and the alchohol distilled from the dissolved product. The product was found to have a hydroxide number of 364.

Eight hundred g. of product was returned to the reactor along with 230 g. of flaked sodium hydroxide. The charge was heated to 250° F. and stirred under vacuum (30 mm. Hg) for 2 hours. 295 g. of methyl chloride was then added over a 3 hour period at 250°–280° F. and 20–50 p.s.i.g. The product was cooled, discharged and filtered. The salt cake was washed with several portions of isopropanol. The isopropanol was distilled from the dissolved product. The recovered product was a clear colorless liquid which had a viscosity of 4.5 centistokes at 25° C. The hydroxyl number of the product was 11.0 which indicates 98.6 percent conversion to the trimethyl ether. The calculated molecular weight of the product is 248.

EXAMPLE 2

Preparation of Ethoxylated-Propoxylated Glycerol Trimethyl Ether

In a manner similar to that described in Example 1, 396 g. of glycerol was reacted with 402 g. of ethylene oxide in a first step, and 402 g. of propylene oxide in a second step, both steps having been carried out at 280° F. over a total reaction time of 4 hours. The adduct was a clear pale yellow liquid which had a hydroxyl number of 588, corresponding to an average molecular weight of 286. 870 grams of the adduct was reacted with 220 g. of flaked sodium hydroxide for 3.5 hours at 250° F. under 30 mm. Hg vacuum. 286 g. of methyl chloride was then added at 250° F and 20–50 p.s.i.g. The product was cooled and filtered, and the byproduct sodium chloride was washed with several portions of isopropanol. After distilling off the isopropanol, the product was found to have a hydroxyl number of 226. 820 g. of the product was returned to the reactor and alkylated with 148 g. of sodium hydroxide and 190 g. of methyl chloride in the same manner as in Example 1. The product was cooled and filtered, and the salt washed with isopropanol which was then removed by distillation. The product was a clear pale yellow liquid which had a viscosity of 7.0 centistokes at 25° C. The hydroxyl number was 16.1 which indicates a conversion of 97.3 percent to the trimethyl ether. The calculated molecular weight of the product is 328.

EXAMPLE 3

Preparation of Ethoxylated Sorbitol Tetramethyl Ether

To a stainless steel pressure reactor is charged 182 g. of sorbitol (1 M) and 0.3 g. of powdered sodium hydroxide. While heating and melting at about 280° F., 176 g. (4 M) of ethylene oxide is slowly added over a period of about 3 hours. After vacuum stripping the ethoxylated sorbitol, 170 g. (4.25 M) of sodium hydroxide is added and the stirred mixture is heated to 250° F. while generated water is removed under a vacuum of about 30 mm. Hg. At the end of a 3 hour strip, 210 g. (4.2 M) of methyl chloride is added slowly at 250° F. and 20 to 50 p.s.i.g. When the addition is completed, the product is cooled and filtered. The filter cake is washed with small portions of isopropanol. The combined filtrate and isopropanol washings are stripped of the isopropanol. The product has a calculated molecular weight of 414.

EXAMPLE 4

Preparation of Ethoxylated Pentaerythritol Trimethyl Ether

To a reactor is charged 136 g. (1 M) of pentaerythritol, 0.5 g. of sodium hydroxide and about 200 g. of water to form a slurry. This mixture is heated to 220° F. and first 44 g. (1 M) of ethylene oxide is added over a 5 hour period. The water is then stripped off and the material is treated with an additional 88 g. (2 M) of ethylene oxide to form the 3 mole adduct. Then 125 g. (3.1 M) of sodium hydroxide is added to form the sodium alcoholate and the mixture is heated at 250° F. while generated water is removed under vacuum at 30 mm. Hg. At the end of a 4 hour strip, 155 g. of methyl chloride (3.1 M) is slowly added at 250° F. and 20 to 50 p.s.i.g. When the addition is complete the product is diluted with isopropanol and salt is filtered off. Stripping of the isopropanol gives a product with a calculated molecular weight of 310.

MEASUREMENT OF ACID GAS SOLUBILITIES IN SOLVENTS

The suitability of the polyol ethers of this invention for use as solvents for acid gases was demonstrated experimentally in a series of tests wherein the solubilities of $CO_2$ and $H_2S$ in a group of solvents were determined. Solubilities were determined by sealing a known volume of solvent in a stirred pressure reactor at 100° F. and adding weighed amounts of $CO_2$ or $H_2S$ to the reactor. From the weight of gas added, and the equilibrium pressure obtained, a series of calculations provided the solubility of the gas in the solvent at 100° F. and the pressure of the system. The data obtained at several pressures when plotted on a graph allowed calculation of solubility at any desired pressure. The following example illustrates the method specifically.

EXAMPLE A

To a 500 ml. sample of a solvent in a stirred 2-liter pressure reactor was added liquid carbon dioxide in weighed 5.0 gram increments. After allowing 5 minutes to reach equilibrium, the pressure of the system was recorded. This pressure, corresponding to the partial pressure of carbon dioxide, was used to calculate the amount of gas in the vapor phase. The known weight of carbon dioxide present then allowed the determination of the weight of dissolved gas. A constant temperature of 100° F. was maintained during the tests by heating or cooling as necessary. Solubilities were recorded in terms of grams of carbon dioxide per 100 ml. of solvent. A plot of solubility vs. partial pressure permitted comparisons of various solvents at the same pressure.

The solubility of hydrogen sulfide in the solvents was measured by essentially the same method.

In the following Table 1, $CO_2$ and $H_2S$ solubility in three of the solvents of this invention are recorded along with data for propylene carbonate and polyethylene glycol dimethyl ether, compounds which have been used commercially for acid gas removal. The $CO_2$ solubilities are given at 100 p.s.i. partial pressure and the $H_2S$ solubilities are given at 50 p.s.i. partial pressure. The data show these methyl ether derivatives of polyether polyols have high solvency for both $CO_2$ and $H_2S$.

TABLE 1

Acid Gas Solubilities in Various Solvents at 100° F.

| Solvent | $CO_2$ solubility (Gm/100 ml at 100 psi) | $H_2S$ solubility (Gm/100 ml at 50 psi) |
| --- | --- | --- |
| Ethoxylated glycerol Trimethyl Ether 321 Mol. Wt. | 2.88 | 7.9 |
| Ethoxylated propoxylated glycerol trimethyl ether 328 Mol. Wt. | 3.15 | 6.9 |
| Ethoxylated Glycerol Trimethyl ether 248 Mol. Wt. | 3.35 | 7.8 |
| Polyethylene glycol dimethyl ether | 3.25 | 7.9 |
| Propylene Carbonate | 3.45 | 4.1 |

A comparison of some of the physical properties of the compounds of this invention with those of propylene carbonate and polyethylene glycol dimethyl ether are given in Table 2.

TABLE 2

Comparison of Physical Properties of Solvents

| Solvent | Viscosity 25° C | Vapor pressure 100° C |
| --- | --- | --- |
| Ethoxylated glycerol trimethyl ether 321 Mol. Wt. | 7.3 cst | 0.5 mm Hg |
| Ethoxylated propoxylated glycerol trimethyl ether 328 Mol. Wt. | 7.0 cst | 0.4 mm Hg |
| Ethoxylated glycerol trimethyl ether 248 Mol. Wt. | 4.7 cst | 0.9 mm Hg |
| Polyethylene glycol dimethyl ether | 6.1 cst | 1.4 mm Hg |
| Propylene carbonate | 2.1 cst | 7.5 mm Hg |

Table 2 shows the instant compounds can have an approximately 25 percent lower viscosity than commercial polyethylene glycol dimethyl ether and considerable lower vapor pressure than propylene carbonate or polyethylene glycol dimethyl ether. Low viscosity speeds up absorption rates, and low vapor pressure decreases solvent losses during flashing.

Foaming is also a problem in actual plant operation of gas purifying absorption columns, as this can cause foam-over and reduction of operating rates. Tests were therefore run by bubbling air through a fritted glass disc into a column of solvent at a controlled rate. It was found in this way that the trimethyl ethers of the present invention foamed 10 percent less than the polyethylene glycol dimethyl ether and 20 percent less than propylene carbonate.

Various changes and modifications of the invention can be made, and, to the extent that such variations incorporate the spirit of this invention, they are intended to be included within the scope of the appended claims.

What is claimed is:

1. A process for removing gaseous acid gases of this group consisting of carbon dioxide and hydrogen sulfide from admixture with other gases selected from the group consisting of hydrogen, nitrogen and lower alkane hydrocarbons, which comprises contacting the gaseous admixture at superatmospheric pressure with a solvent comprising a mixture of polymethyl ethers of an alkoxylated polyol which has from three to about six hydroxyl groups per molecule, and then removing the dissolved acid gases from the enriched solvent.

2. A process according to claim 1 in which the solvent has an average molecular weight from 150 to 800.

3. A process for removing gaseous acid gases of the group consisting of carbon dioxide and hydrogen sulfide from admixture with other gases selected from the group consisting of hydrogen, nitrogen and lower alkane hydrocarbons, which comprises contacting the gaseous admixture at superatmospheric pressure with a solvent comprising a polymethyl ether of a polyether polyol, said polyether polyol having the formula

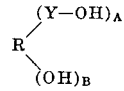

wherein R is the residue of an organic compound containing therein three to six active hydrogen atoms present in hydroxyl groups, A is a number from 1 to 6, B is a number from 0 to 5 and A + B equals 3 to 6, and Y represents from 1 to 15

$$-CH_2CH_2O-\text{ or }-CH_2\overset{CH_3}{\underset{|}{C}}HO-$$

groups or such groups in admixture and said polymethyl ether contains at least three methyl ether groups per molecule, and then removing the dissolved acid gases from the enriched solvent.

4. A process for removing gaseous acid gases of the group consisting of carbon dioxide and hydrogen sulfide from admixture with other gases selected from the group consisting of hydrogen, nitrogen and lower alkane hydrocarbons, which comprises contacting the gaseous admixture at superatmospheric pressure with a solvent comprising a composition of the formula $$\begin{bmatrix} CH_2O-X-CH_3 \\ CHO-Y-CH_3 \\ CH_2O-Z-CH_3 \end{bmatrix}_A$$

wherein X, Y and Z represent from 0 to 15

$$-CH_2CH_2O-\text{ or }-CH_2\overset{CH_3}{\underset{|}{C}}HO-$$

groups or such groups in admixture and the sum of X + Y + Z is 1 to 15, and A is 1 to 4.

5. A process according to claim 4 in which A is 1 and X, Y and Z are approximately the same number.

6. A process according to claim 4 in which the solvent is an ethoxylated glycerol trimethyl ether.

7. A process according to claim 4 in which the solvent is an ethoxylated propoxylated glycerol trimethyl ether.

8. A process for removing gaseous acid gases of the group consisting of carbon dioxide and hydrogen sulfide from admixture with other gases selected from the group consisting of hydrogen, nitrogen and lower alkane hydrocarbons, which comprises contacting the gaseous admixture at superatmospheric pressure with a solvent comprising a polymethyl ether of a polyether polyol, said polyether polyol having the formula $$(CH_3O)_F-\overset{(Y-OH)_C}{\underset{(OH)_E}{R}}-(Y-OCH_3)_D$$

wherein C is a number from 0 to 3, D is a number from 1 to 6, E is a number from 0 to 3, F is a number from 0 to 5 and C + D + E + F equals 3 to 6, Y represents from 1 to 15

$$-CH_2CH_2O-\text{ or }-CH_2\overset{CH_3}{\underset{|}{C}}HO-$$

groups or such groups in admixture in random or block arrangement, and R is the residue of an organic compound containing therein three to six active hydrogen atoms present in hydroxyl groups, and then removing the dissolved acid gases from the enriched solvent.

* * * * *

UNITED STATES PATENT OFFICE
CERTIFICATE OF CORRECTION

Patent No. 3,653,183  Dated April 4, 1972

Inventor(s) Herbert L. Sanders, et al.

It is certified that error appears in the above-identified patent and that said Letters Patent are hereby corrected as shown below:

Column 1, line 62, "y" should be --Y--; column 2, line 38, "U.S. Pat. Nos." should be --United States patents--; column 3, line 21, "and" should be --to--; column 3, lines 25-29,  should be column 4, line 15, "hydroxide" should be --hydroxyl--; column 6, line 46, "this" should be --the--; column 7, lines 15-19, 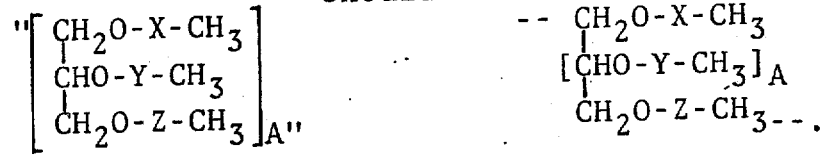 should be Signed and sealed this 18th day of July 1972.

(SEAL)
Attest:

EDWARD M. FLETCHER, JR.
Attesting Officer

ROBERT GOTTSCHALK
Commissioner of Patents